Figure 1:
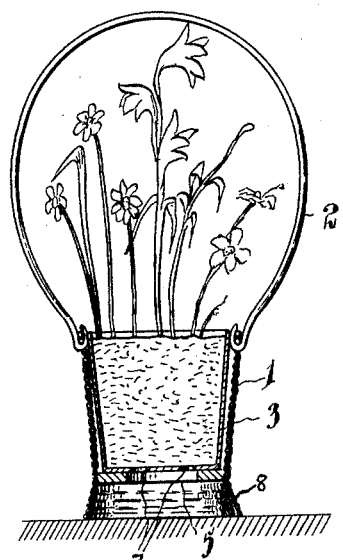

Feb. 23, 1932. P. F. MORLEY 1,846,433
FLOWER AND PLANT HOLDER
Filed March 4, 1930

Inventor
P. F. Morley
by J. Edw. Maybee
ATTY.

Patented Feb. 23, 1932

1,846,433

UNITED STATES PATENT OFFICE

PERCIVAL F. MORLEY, OF TORONTO, ONTARIO, CANADA

FLOWER AND PLANT HOLDER

Application filed March 4, 1930, Serial No. 433,137, and in Canada September 24, 1929.

This invention relates to containers for cut or potted flowers, having an inner container and an outer ornamental holder. With containers of this kind, especially when used in gardens or cemeteries, it frequently happens that drainage or overflow from the vase or flower pot collects in the inner container and becomes stagnant, which is unpleasant, unhealthy, and harmful to potted plants, or if the inner container is provided with drainage means, or if it overflows, stagnant water collects within the outer ornamental holder or seeps through the outer ornamental holder, staining and soiling the same. This is particularly the case where the outer holder is of wicker or other openwork construction where dirty drainage water passing therethrough leaves a deposit of earth or other material on the outside thereof, or stains the outside with substances in suspension in the water.

The object of my invention is to provide perfect drainage for the inner container and the outer ornamental holder or basket in such a way as to prevent the collection of stagnant water therein, and the soiling of the ornamental holder. I attain my object by providing a drainage opening or openings in the base of the outer ornamental holder, and a drainage opening or openings in the inner flower or plant container substantially smaller than the corresponding opening or openings in the ornamental holder, and located in vertical alignment therewith so that drainage from the inner container passes directly through the drainage opening or openings in the ornamental holder without coming into contact with the latter. A further feature of the invention is the provision of legs or other supports, which may project slightly outwards, to raise the base of the ornamental holder above the ground, thus facilitating the passage of moisture through the drainage hole or holes, and also adding to the stability and appearance of the ornamental holder. Preferably the support comprises spaced legs to permit moisture to flow freely away from beneath the holder after passing through the drainage opening, but I may have a wicker work or similar spaced support which serves the same purpose by permitting moisture to escape through the interstices. A further object of my invention is to provide suitable means for supporting an ornamental holder such as described in an upright position on the ground, and for this purpose I provide the inner container with a depending spike which passes through the drainage hole in the base of the ornamental holder, and may be forced into the ground to maintain the container and holder in an upright position.

While this construction may be used for flower and plant containers of all kinds, it is particularly advantageous for use in gardens and cemeteries, especially the latter, where it is not always possible to exercise due care in the watering of the flowers, and where heavy rains are likely to cause the pots or vases containing the flowers to overflow. With this construction any overflow from excess of watering or rains runs immediately to the ground without collecting and stagnating, and without flowing down or seeping through the sides of the ornamental holder and staining same. This construction is likewise of special advantage where the ornamental holder consists of a wicker or wooden basket or similar non-waterproof receptacle through which soiled water would easily soak.

Figure 2:
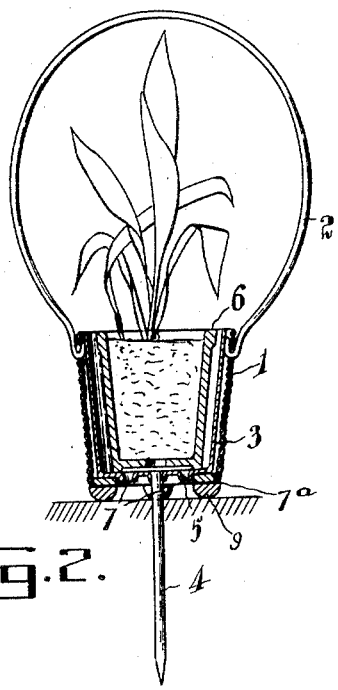
Figure 3:
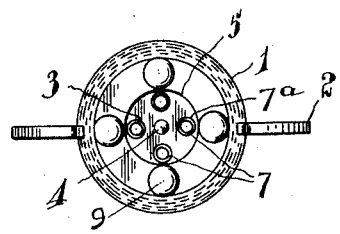

The invention is hereinafter more particularly described and illustrated in the accompanying drawings, in which Fig. 1 is a vertical section of my improved flower holder showing the inner container filled with earth in which a plant is held;

Fig. 2 is a vertical section of another form of my improved flower holder, showing the inner container provided with depending spike, and holding an earthenware pot, and Fig. 3 is a plan view of the underside of the container shown in Fig. 2.

In the drawings corresponding numbers in the different figures refer to corresponding parts. 1 is an ornamental holder which may be of wicker, brass, crockery or the like, and may be in the form of a basket, having a handle 2. A container 3 fits snugly into the holder 1. Although this container is preferably made of tin or other metal, it may be constructed of porous earthenware, especially in the form shown in Fig. 1.

In the base of the ornamental holder a circular aperture 5 is formed. In the base of the container 3 a plurality of drainage holes 7 are provided. These drainage holes 7 are located in vertical alignment with the aperture 5 and in juxtaposition therewith so that moisture passing through them passes directly through the aperture 5 to the ground without touching the ornamental holder.

In the modification shown in Fig. 2 a spike 4 depends from the bottom of the container 3 through the aperture 5 in the ornamental holder, and is adapted to be forced into the ground to maintain the container 3 and ornamental holder 1 in a secure, upright position.

In Fig. 2 an ornamental flower pot 6 is shown fitted into the container 3, but the plant may be potted in the container 3 itself as shown in Fig. 1, if desired. For cut flowers a vase or other container may be substituted for the pot 6 in Fig. 2, or may be placed in the container 3 in Fig. 1.

A support 8 as shown in Fig. 1 may be used to raise the base of the ornamental container from the ground and thus facilitate the drainage thereof, or legs 9 may be provided as in Figs. 2 and 3 for effecting the same purpose.

There may be a tendency for water passing through the drainage holes 7 in the container 3 to flow to one side underneath the container under the influence of capillarity instead of passing directly downwards through the aperture 5 to the ground. This is especially so in cases where the holder is not standing level. To avoid this I may form lips 7ª as shown in Fig. 2, extending downwardly from the drainage holes 7.

What I claim as my invention is:—

1. The combination of a container having a drainage hole in its bottom, and an openwork holder in which the container is adapted to be fitted, said holder having an opening in its base, the area of the opening being at least as great as the area of the drainage hole in the container, said drainage hole and opening being adapted to be arranged in juxtaposition and in substantially vertical alignment, so that the moisture from the former passes directly through the latter.

2. The combination of a container having a plurality of drainage holes arranged centrally of its bottom, and an openwork holder in which the container is adapted to be fitted, said holder having an opening located centrally of its bottom of sufficient area that all of the drainage holes in the container are in substantially vertical alignment therewith.

3. The combination of a container having a spike depending from its bottom centrally thereof and a plurality of drainage holes in said bottom arranged about said spike, and a non-waterproof holder in which the container is adapted to be fitted, said holder having an opening located centrally of its bottom through which the spike is adapted to pass and which is of sufficient area that all the drainage holes in the container are in substantially vertical alignment therewith.

4. The combination of a container having a spike depending from its bottom and a drainage hole in said bottom adjacent said spike, and a holder in which the container is adapted to be fitted, said holder having an opening in its bottom through which the spike is adapted to pass and which is of sufficient area that the drainage hole in the container is in substantially vertical alignment therewith.

5. The combination of a container having a drainage hole in its bottom provided with a downwardly extending lip, and an openwork holder in which the container is adapted to be fitted, said holder having an opening in its base, the area of the opening being at least as great as the area of the drainage hole in the container, said drainage hole and opening being adapted to be arranged in juxtaposition and in substantially vertical alignment, said lip entering said opening and directing moisture from the drainage hole through the opening without contacting with the bottom of the holder.

6. The combination of a container having a drainage hole in its bottom, and an openwork holder in which the container is adapted to be fitted, said holder having an opening in its base, the area of the opening being at least as great as the area of the drainage hole in the container, said drainage hole and opening being adapted to be arranged in juxtaposition and in substantially vertical alignment, so that the moisture from the former passes directly through the latter; and spaced supporting means for the holder adapted to maintain the bottom thereof in spaced relationship to the ground, and permit the passage of moisture from beneath the holder.

7. The combination of a container having a spike depending from its bottom, and a holder in which the container is adapted to be fitted, said holder having an opening in its bottom through which the spike is adapted to pass.

Signed at the city of Toronto, Canada, this 28th day of February, 1930.

PERCIVAL F. MORLEY.